Sept. 18, 1962 E. B. C. KHU 3,054,971
FREQUENCY SHIFT OSCILLATOR
Filed Nov. 10, 1959
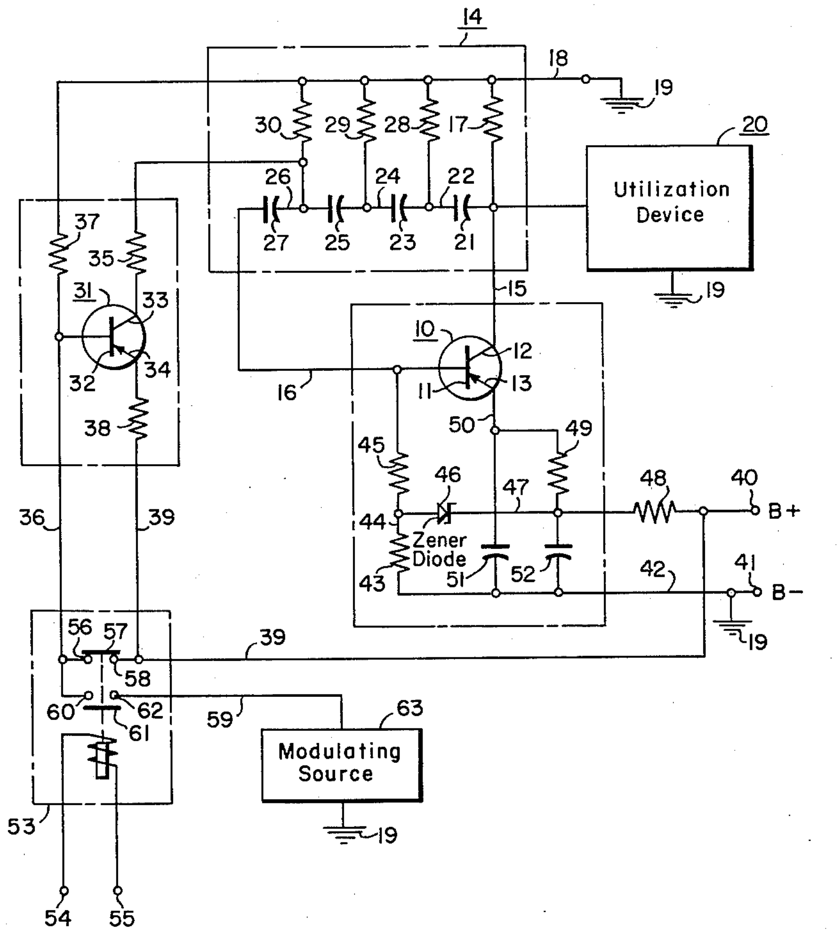
WITNESSES
Edwin E. Bassler
James F. Young
INVENTOR
Eric Bun Chiong Khu
BY Maury I. Hull
ATTORNEY 3,054,971
Patented Sept. 18, 1962

3,054,971
FREQUENCY SHIFT OSCILLATOR

Eric B. C. Khu, Hyattsville, Md., assignor to Westinghouse Electric Corporation, East Pittsburgh, Pa., a corporation of Pennsylvania Filed Nov. 10, 1959, Ser. No. 852,032
2 Claims. (Cl. 331—108)

This invention relates to improvements in oscillators, and more particularly to oscillators of the type adapted to be keyed or adapted to have the frequency periodically or aperiodically shifted by a modulating or switching source.

In summary, the apparatus of the instant invention comprises a transistor oscillator with a multistable phase shifting R-C network in the feedback path. An additional switching transistor is provided for while conductive and non-conductive, or saturated and de-saturated, selectively switching an additional resistor or combination of resistors into and out of the circuit in shunt with a resistor of the R-C network to thereby vary the feedback provided by the R-C network and accordingly vary the frequency of oscillations. In addition, a means is provided in the oscillator circuit itself for stabilizing the gain of the oscillator transistor and stabilizing the circuit against the effects of changes in temperature and/or variation of direct current supply voltage.

Accordingly, a primary object of the instant invention is to provide a new and improved oscillator circuit.

Another object is to provide a new and improved frequency shifting oscillator circuit.

These and other objects will become more clearly apparent after a study of the following specification when read in connection with the accompanying drawing in which the single figure thereof is a schematic electrical diagram of the preferred embodiment of the invention.

In the figure, a transistor generally designated 10 and having a base 11, collector 12 and emitter 13 has a feedback path between the base and collector which includes the R-C phase-shifting network enclosed in dashed lines and generally designated 14, the collector 12 being connected to the network 14 by lead 15 and the base 11 being connected to the network 14 by the lead means 16. Lead 15 is connected by way of resistor 17 and lead 18 to ground 19. Lead 15 is also connected to a utilization device of high input impedance generally designated 20. Lead 15 is also connected by way of capacitor 21, lead 22, capacitor 23, lead 24, capacitor 25, lead 26, and capacitor 27 to the aforementioned lead 16. Leads 22, 24 and 26 are connected by way of resistors 28, 29 and 30, respectively, to the aforementioned lead 18. Network 14 may consist of elements other than the aforementioned resistors 17, 28, 29, 30 and capacitors 21, 23, 25 and 27.

An additional switching transistor generally designated 31 is provided having a base 32, collector 33 and emitter 34. Collector 33 is connected by way of resistor 35 to the aforementioned lead 26. Base 32 is connected by way of lead 36 and resistor 37 to the aforementioned lead 18. The aforementioned emitter 34 is connected by way of resistor 38 and lead 39 to the positive terminal 40 of a suitable source of direct current energizing potential, not shown, having the other negative terminal 41 connected to lead 42 and ground 19. Lead 42 is further connected by way of resistor 43, lead 44, and resistor 45 to the aforementioned lead 16 and thence to base 11. Lead 44 is connected by way of a Zener diode 46, lead 47 and resistor 48 to the aforementioned lead 39. Lead 47 is connected by way of resistor 49 and lead 50 to the aforementioned emitter 13, lead 50 also being connected by way of capacitor 51 to the aforementioned lead 42. Leads 47 and 42 also have capacitor 52 connected therebetween.

A relay shown in dashed outline as 53 is provided having energizing leads 54 and 55, the relay 53 while energized closing the circuit between leads 36 and 39 by way of contact 56, armature 57 and contact 58, and while deenergized opening the circuit between contacts 56—58 and closing the circuit between lead 36 and lead 59 by way of contact 60, armature 61 and contact 62. The aforementioned lead 59 is connected to one terminal of a modulating source shown in block form as 63 which has the other terminal thereof connected to ground 19. Preferably the modulating source 63 provides a signal having a square waveform.

In the operation of the above-described circuit, assume for purposes of explanation that the relay 53 is energized so that the circuit is closed between contacts 56 and 58, and open between contacts 60 and 62. It will be seen that under such circuit conditions a positive potential is applied from terminal 40 by way of lead 39, contact 58, armature 57, contact 56 and lead 36 to the base 32 of switching transistor 31, this positive potential back-biasing the transistor 31 and cutting off this transistor so that it does not substantially affect the circuit. The transistor 10 generates a signal of substantially constant frequency, the transistor 10 and the associated R-C network 14 providing a phase shift oscillator in which a portion of the signal energy at the collector 12 is shifted in phase and applied to the base 11 in such a manner as to sustain the generation of oscillations. The R-C network has a prescribed transfer function determined by the values of capacitors and resistors. The frequency of the oscillations is under the control of the R-C network 14 and is determined by the time constants of the various branches of the circuit and in particular in this circuit is affected by the effective resistance of the branch containing resistor 30. The aforementioned Zener diode 46, which may have a Zener voltage rating of 5 volts, effectively biases the base 11 of the transistor 10 at a constant 5 volt level, and this 5 volt level is maintained irrespective of changes in the potential at terminal 40 and changes in the circuit parameters as a result of temperature effects, etc. The operation of a Zener diode to provide precise voltage control at the Zener voltage rating of the diode is well known and need not be described in further detail.

Assume now by way of description that the coil of relay 53 is deenergized so that the circuit through path 56, 57 and 58 is broken and the circuit through path 60, 61 and 62 closed, and assume further for purposes of explanation that the modulating source 63 is turned off. Under these circuit conditions a positive potential from terminal 40 is no longer applied to the base 32 of the transistor 31 so that the transistor 31 conducts and rapidly assumes a saturated condition, in which saturated condition the emitter-collector path 34—33 connects resistors 35 and 38 in series across the aforementioned resistor 30 thereby changing the effective resistance of this branch of the R-C network 14 and shifting the frequency of oscillations generated in the oscillator transistor 10. It should be noted that the alternating current impedance between terminals 40 and 41 is substantially zero, so that lead 39 may be considered as being at the same A.-C. potential as lead 18. Although, while transistor 31 is conducting, an additional resistance path including resistor 37 and the base-collector impedance of transistor 31 is effectively in parallel with resistor 38, the parallel path is of so much greater impedance, that its effect is not too great, and it may be neglected to simplify description of the operation of the circuit.

Assume now that a voltage of sufficient amplitude, provided from source 63 to lead 36, for example, a square wave, is developed across resistor 37. This square wave voltage applied to the base 32 during the positive alternations thereof cuts off the transistor 31 and during the negative alternations thereof permits the transistor 31 to conduct so that the frequency of oscillations of the oscillator transistor 10 is rapidly shifted between first and second frequency values at a frequency or period corresponding to the period of the voltage developed across resistor 37, from source 63.

There has been provided, then, apparatus well suited to perform the aforedescribed objects of the invention, which is to provide an improved frequency shift oscillator.

Suitable choice of other components being made, the resistance of resistor 30 may have a value of 6.8 kilohms for a frequency of 425 cycles per second, and may have a value of 2.7 kilohms for a frequency of 3315 c.p.s. Resistor 37 may have a value of 33 kilohms. Resistor 35 may have a value of zero for a frequency of 425 cycles per second, and may have a value of 15 kilohms for a frequency of 2635 cycles per second. Resistors 30 and 35 may have intermediate values for intermediate frequencies.

The transistor 31 effectively suppresses the generation of spurious frequencies which would normally be expected to result from on-off keying through the contacts of a relay directly connected in an R-C network.

Whereas the invention has been shown and described with respect to the preferred embodiment thereof which gives satisfactory results, it will be understood that changes may be made and equivalents substituted without departing from the spirit and scope of the invention.

I claim as my invention:

1. A frequency shift oscillator circuit comprising, in combination, oscillator means including first transistor means having base, emitter and collector elements, a Zener diode operatively connected between said base and emitter elements for regulating the bias voltage on said base element of said first transistor means, and a phase shift network including at least one capacitor and at least one resistor, said phase shift network being connected between two of said plurality of elements and providing positive feedback for the generation of oscillations, said oscillator means generating a signal having a frequency in accordance with a prescribed transfer function determined by the values of the resistance and capacitance of the phase shift network, and control circuit means including an additional resistor and second transistor means operatively connected to said phase shift network, said second transistor means being adapted to be selectively energized and deenergized in accordance with a control signal applied thereto, said second transistor means while energized effectively connecting the additional resistor in parallel with said resistor to thereby vary the transfer function of said phase shift network and shift the frequency of the oscillations generated in the oscillator means.

2. A frequency shift oscillator circuit comprising, in combination, oscillator means including first transistor means having base, collector and emitter elements and an R-C phase shift network including a plurality of resistors, biasing means for said first transistor means and a Zener diode operatively connected between said base and emitter elements for regulating the bias voltage on said base element of said first transistor means, said oscillator means generating a signal having a frequency determined at least in part by the values of capacitance and resistance in the R-C network, second transistor means having a base, collector, and emitter, control circuit means including at least one additional resistor operatively connected the emitter-collector path of the second transistor means in parallel with one of said plurality of resistor, and means including switching means for selectively connecting to the second transistor means a source of direct current potential which back-biases the second transistor means and cuts off the second transistor means thereby effectively disconnecting the additional resistor from the circuit, and selectively connecting to the second transistor means a modulating source, said modulating source developing a voltage which periodically or aperiodically cuts the second transistor means on and off to thereby periodically or aperiodically connect the additional resistor in parallel with said one resistor of the R-C network and periodically or aperiodically shift the frequency of oscillations in the first transistor means.

References Cited in the file of this patent

UNITED STATES PATENTS

| | | |
|---|---|---|
| 2,672,509 | McCoy | Mar. 16, 1954 |
| 2,777,951 | Charlton | Jan. 15, 1957 |
| 2,858,437 | Kern | Oct. 28, 1958 |
| 2,874,293 | McMurren | Feb. 17, 1959 |

FOREIGN PATENTS

| | | |
|---|---|---|
| 804,472 | Great Britain | Nov. 19, 1958 |
| 576,985 | Canada | May 19, 1959 |